United States Patent
Cereghini et al.

(10) Patent No.: US 6,615,205 B1
(45) Date of Patent: *Sep. 2, 2003

(54) HORIZONTAL IMPLEMENTATION OF EXPECTATION-MAXIMIZATION ALGORITHM IN SQL FOR PERFORMING CLUSTERING IN VERY LARGE DATABASES

(76) Inventors: Paul M. Cereghini, 3147 Olive Knoll Pl., Escondido, CA (US) 92027; Carlos Ordonez, 875 Corte Merano, Escondido, CA (US) 92026

( * ) Notice: Subject to any disclaimer, the term of this patent is extended or adjusted under 35 U.S.C. 154(b) by 126 days.

This patent is subject to a terminal disclaimer.

(21) Appl. No.: 09/747,858

(22) Filed: Dec. 22, 2000

(51) Int. Cl.[7] .............................................. G06F 17/30
(52) U.S. Cl. ........................................................... 707/3
(58) Field of Search ............................... 707/2, 3, 4, 5, 707/6, 7

(56) References Cited

U.S. PATENT DOCUMENTS

| | | | | |
|---|---|---|---|---|
| 6,115,708 A | * | 9/2000 | Fayyad et al. ................. | 707/6 |
| 6,226,334 B1 | * | 5/2001 | Olafsson ..................... | 375/342 |
| 6,345,265 B1 | * | 2/2002 | Thiesson et al. .............. | 706/52 |
| 6,374,251 B1 | * | 4/2002 | Fayyad et al. ............... | 707/101 |
| 6,449,612 B1 | * | 9/2002 | Bradley et al. ................ | 707/6 |

* cited by examiner

*Primary Examiner*—Diane D. Mizrahi

(57) ABSTRACT

A method for performing cluster analysis inside a relational database management system. The method defines a plurality of tables for the storage of data points and Gaussian mixture parameters and executes a series of SQL statements implementing an Expectation-Maximization clustering algorithm to iteratively update the Gaussian mixture parameters stored within the tables.

7 Claims, 5 Drawing Sheets

FIG. 3

| Matrix | size | contents |
|---|---|---|
| C | $p \times k$ | means ($\mu$) |
| R | $p \times p$ | covariances ($\Sigma$) |
| W | $k \times 1$ | weights ($w_j$) |

FIG. 4

| Size | value |
|---|---|
| $k$ | number of clusters |
| $p$ | dimensionality |
| $n$ | number of data points |

FIG. 6

| Table | PK | columns | # | Contents |
|---|---|---|---|---|
| Y | RID | y1,y2...yp | n | data points |
| YD | RID | d1,d2...dk | n | distances |
| YP | RID | p1,p2...pk,sump | n | probabilities |
| YX | RID | x1,x2...xk,llh | n | responsib's |
| C1..CK | - | y1,y2...yp | 1 | means |
| R | - | y1,y2...yp | 1 | covariances |
| W | - | w1,w2...2k,llh | 1 | weights |
| GMM | - | n,twopipdiv2 | 1 | other |
|  | - | sqrtdetR |  | parameters |

FIG. 5

- Input: $k$, # of clusters. $Y = \{y_1 \ldots y_n\}$ a set of $n$ $p$-dimensional points. $\varepsilon$, a tolerance for loglikelihood. *maxiterations*, a maximum number of iterations.

- Output: $C$, $R$, $W$, the matrices containing the updated mixture parameters. $X$, a matrix with cluster membership probabilities.

1. Initialize. Set initial values for $C$, $R$, $W$ (random or approximate solution from sample)

2. WHILE change in loglikelihood *llh* is greater than $\varepsilon$ and *maxiterations* has not been reached DO E and M steps

E step

$C' = 0$, $R' = 0$, $W' = 0$, $llh = 0$
   for $i = 1$ to $n$
      $sump_i = 0$
      for $j = 1$ to $k$
        $\delta_{ij} = (y_i - C_j)^t R^{-1}(y_i - C_j)$
        $P_{ij} = \dfrac{w_j}{(2\pi)^{p/2}|R|^{1/2}} exp[-\tfrac{1}{2}\delta_{ij}]$
        $sump_i = sump_i + p_{ij}$
      endfor
      $x_i = p_i/sump_i$, $llh = llh + ln(sump_i)$
      $C' = C' + y_i x_i^t$, $W' = W' + x_i$
   endfor

M step for $j = 1$ to $k$
   $C_j = C'_j/W'_j$
   for $i = 1$ to $n$    $R' = R' + (y_i - C_j)x_{ij}(y_i - C_j)^t$ endfor
   endfor
   $R = R'/n$, $W = W'/n$

HORIZONTAL IMPLEMENTATION OF EXPECTATION-MAXIMIZATION ALGORITHM IN SQL FOR PERFORMING CLUSTERING IN VERY LARGE DATABASES

CROSS-REFERENCE TO RELATED APPLICATIONS

This application is related to the following U.S. Patent Applications, filed on even date herewith:

U.S. patent application Ser. No. 09/747,856 by Paul Cereghini and Carlos Ordonez and entitled "METHOD FOR PERFORMING CLUSTERING IN VERY LARGE DATABASES," the disclosure of which is incorporated by reference herein.

U.S. patent application Ser. No. 09/747,857 by Paul Cereghini and Carlos Ordonez and entitled "VERTICAL IMPLEMENTATION OF EXPECTATION-MAXIMIZATION ALGORITHM IN SQL FOR PERFORMING CLUSTERING IN VERY LARGE DATABASES."

FIELD OF THE INVENTION

This invention relates in general to a relational database management system, and in particular, to an analytic algorithm implemented in SQL for performing cluster analysis in very large databases.

BACKGROUND OF THE INVENTION

Relational databases are the predominate form of database management systems used in computer systems. Relational database management systems are often used in so-called "data warehouse" applications where enormous amounts of data are stored and processed. In recent years, several trends have converged to create a new class of data warehousing applications known as data mining applications. Data mining is the process of identifying and interpreting patterns in databases, and can be generalized into three stages.

Stage one is the reporting stage, which analyzes the data to determine what happened. Generally, most data warehouse implementations start with a focused application in a specific functional area of the business. These applications usually focus on reporting historical snap shots of business information that was previously difficult or impossible to access. Examples include Sales Revenue Reporting, Production Reporting and Inventory Reporting to name a few.

Stage two is the analyzing stage, which analyzes the data to determine why it happened. As stage one end-users gain previously unseen views of their business, they quickly seek to understand why certain events occurred; for example a decline in sales revenue. After discovering a reported decline in sales, data warehouse users will then obviously ask, "Why did sales go down?" Learning the answer to this question typically involves probing the database through an iterative series of ad hoc or multidimensional queries until the root cause of the condition is discovered. Examples include Sales Analysis, Inventory Analysis or Production Analysis.

Stage three is the predicting stage, which tries to determine what will happen. As stage two users become more sophisticated, they begin to extend their analysis to include prediction of unknown events. For example, "Which end-users are likely to buy a particular product", or "Who is at risk of leaving for the competition?" It is difficult for humans to see or interpret subtle relationships in data, hence as data warehouse users evolve to sophisticated predictive analysis they soon reach the limits of traditional query and reporting tools; Data mining helps end-users break through these limitations by leveraging intelligent software tools to shift some of the analysis burden from the human to the machine, enabling the discovery of relationships that were previously unknown.

Many data mining technologies are available, from single algorithm solutions to complete tool suites. Most of these technologies, however, are used in a desktop environment where little data is captured and maintained. Therefore, most data mining tools are used to analyze small data samples, which were gathered from various sources into proprietary data structures or flat files. On the other hand, organizations are beginning to amass very large databases and end-users are asking more complex questions requiring access to these large databases.

Unfortunately, most data mining technologies cannot be used with large volumes of data. Further, most analytical techniques used in data mining are algorithmic-based rather than data-driven, and as such, there are currently little synergy between data mining and data warehouses. Moreover, from a usability perspective, traditional data mining techniques are too complex for use by database administrators and application programmers, and are too difficult to change for a different industry or a different customer.

One analytic algorithm that performs the task of modeling multidimensional data is "cluster analysis." Cluster analysis finds groupings in the data, and identifies homogenous ones of the groupings as clusters. If the database is large, then the cluster analysis must be scalable, so that it can be completed within a practical time limit.

In the prior art, cluster analysis typically does not work well with large databases due to memory limitations and the execution times required. Often, the solution to finding clusters from massive amounts of detailed data has been addressed by data reduction or sampling, because of the inability to handle large volumes of data. However, data reduction or sampling results in the potential loss of information.

Thus, there is a need in the art for data mining applications that directly operate against data warehouses, and that allow non-statisticians to benefit from advanced mathematical techniques available in a relational environment.

SUMMARY OF THE INVENTION

To overcome the limitations in the prior art described above, and to overcome other limitations that will become apparent upon reading and understanding the present specification, the present invention discloses a method for performing cluster analysis in a relational database management system utilizing an analytic algorithm implemented in SQL. The analytic algorithm for cluster analysis includes SQL statements and programmatic iteration for finding groupings in the data retrieved from the relational database management system and for identifying homogenous ones of the groupings as clusters.

In the described embodiment, the method is applied to perform clustering within a relational database management system to group a set of n data points into a set of k clusters, each data point having a dimensionality p. A plurality of first tables, Cl through Ck, each table having p columns and 1 row, are established for the storage of means values, each one of tables Cl through Ck representing a cluster; a second table, R, having p columns and 1 row, is established for the storage of covariance values; and a third table, W, having k+1 columns and 1 row, is established for the storage of weight values. A series of SQL commands implementing an Expectation-Maximization clustering algorithm are executed to iteratively update the means values, covariance values and weight values stored in said first, second and third tables.

An object of the present invention is to provide more efficient usage of parallel processor computer systems. Further, an object of the present invention is to allow data mining of large databases.

BRIEF DESCRIPTION OF THE DRAWINGS

Referring now to the drawings in which like reference numbers represent corresponding parts throughout:

FIG. 3 is a table identifying matrices for the storage of Gaussian Mixture parameters in accordance with the present invention.

FIG. 4 is a table identifying the variables that establish the sizes for the matrices of identified in FIG. 3.

FIG. 5 illustrates psuedo code for implementing an Expectation-Maximization clustering algorithm.

FIG. 6 identifies SQL tables utilized to perform clustering in very large databases in accordance with the present invention.

DETAILED DESCRIPTION

In the following description, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

The present invention provides a relational database management system (RDBMS) that supports data mining operations of relational databases. In essence, advanced analytic processing capabilities for data mining applications are placed where they belong, i.e., close to the data. Moreover, the results of these analytic processing capabilities can be made to persist within the database or can be exported from the database.

A relational database management system is a software program that is used to create, maintain, update, modify and manipulate a relational database. Within a relational database data is stored in relations or tables. Within the table, data is organized in tuples, or records, and attributes, or fields. Each field in a table represents a characteristic of the subject of the table, and each record in the table represents a unique instance of the subject of the table. Each record in the table is composed of the complete set of fields, and is uniquely identified by a field identified as a primary key. Each attribute or field has a simple data type. Arrays, for instance, are not allowed.

Hardware Environment

Figure 1:
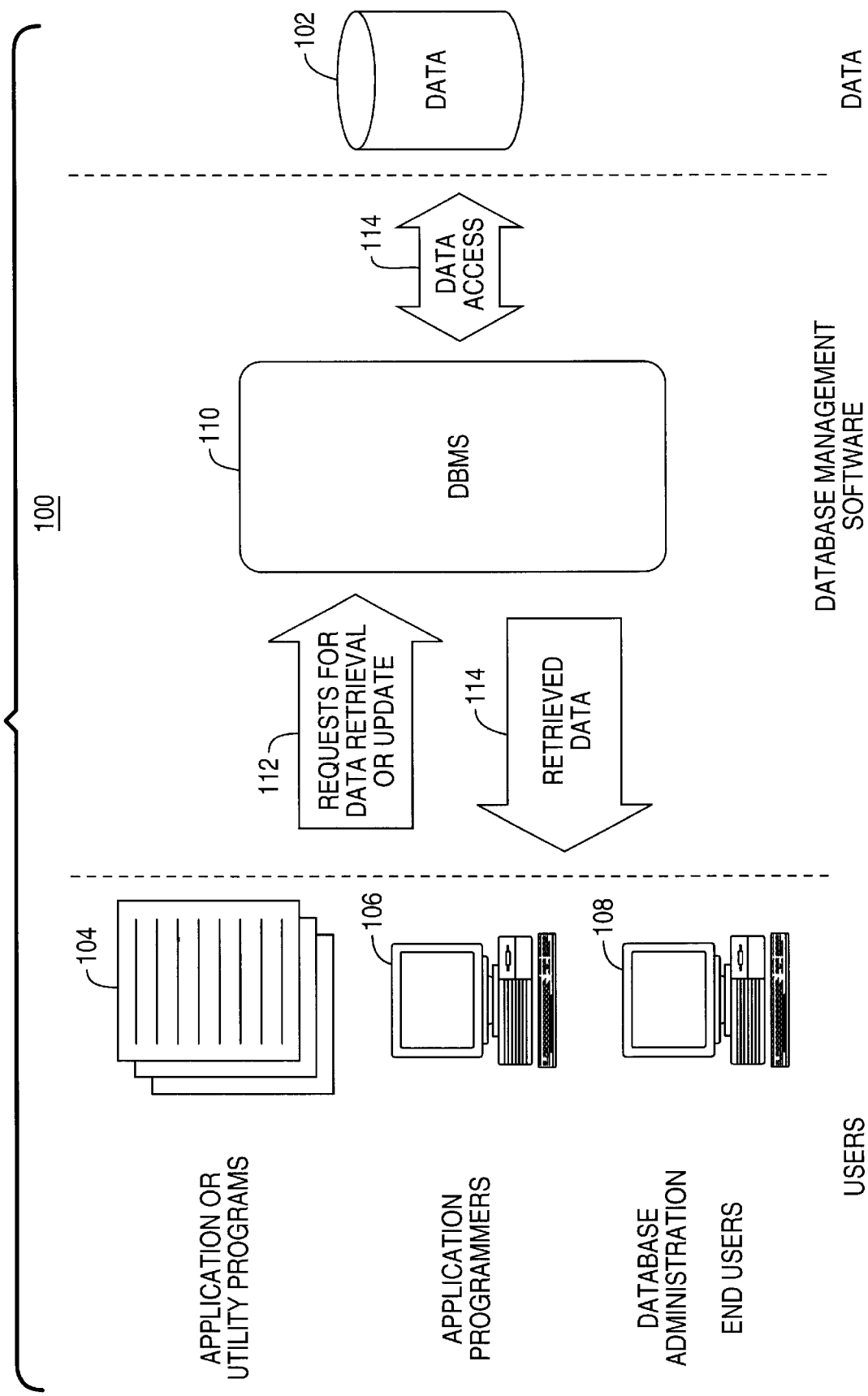
FIG. 1 is a system diagram of the components of a computer system including a relational database management system (RDBMS) that could be used with the clustering algorithm of the present invention.
Figure 2:
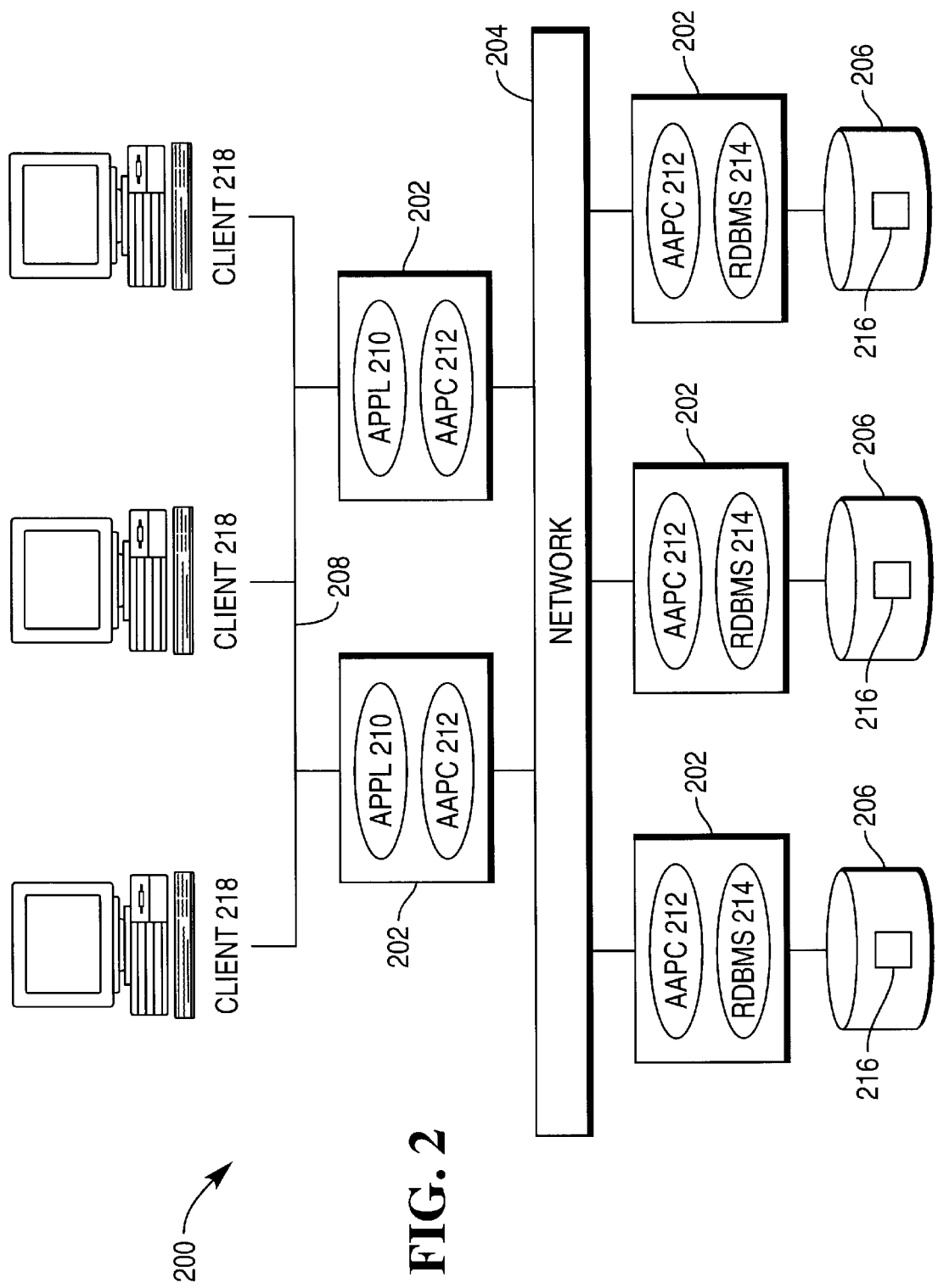
FIG. 2 is a block diagram that illustrates an exemplary parallel processing computer hardware environment that could be used with the clustering algorithm of the present invention.

The data comprising a database may reside within a single storage device, as shown in FIG. 1, or may be distributed throughout a computer system or network, such as in the networked system illustrated in FIG. 2. Referring to FIG. 1, a computer system 100 is shown comprising one or more processors coupled to one or more fixed and/or removable electronic data storage units (DSUs) 102, such as disk drives, that store one or more relational databases, along with other data and programs. The computer system 100 is connected to client systems, such as application or utility programs 104 and workstations 106 and 108 for application programmers, database administrators, and end users.

The computer system 100 executes RDBMS software 110 that acts as an interface between users and a relational database stored on the DSUs 102. Operators of the computer system 100 use a terminal or workstation to transmit electrical signals to and from the computer system 100 that represent commands 112 for performing various search and retrieval functions, termed queries, and various data update functions. The RDBMS 110 then performs the desired data access 114 against the relational database, and data retrieved from the relational database is returned 114 to the users 102, 104, 106.

FIG. 2 provides a block diagram of another computer hardware environment that could be used with the clustering algorithm of the present invention. In the exemplary computer hardware environment, a massively parallel processing (MPP) computer system 200 is comprised of one or more nodes 202 interconnected by a network 204. Each of the nodes 102 is comprised of one or more processors, random access memory (RAM), read-only memory (ROM), and other components. It is envisioned that attached to the nodes 202 may be one or more fixed and/or removable data storage units (DSUs) 206 and one or more data communications units (DCUs) 208.

Each of the nodes 202 executes one or more computer programs, such as a Data Mining Application (APPL) 210 performing data mining operations, Advanced Analytic Processing Components (AAPC) 212 for providing advanced analytic processing capabilities for the data mining operations, and/or a Relational Database Management System (RDBMS) 214 for managing a relational database 216 stored on one or more of the DSUs 206 for use in the data mining applications, wherein various operations are performed in the APPL 210, AAPC 212, and/or RDBMS 214 in response to commands from one or more Clients 218. In alternative embodiments, the APPL 210 may be executed in one or more of the Clients 218, or on an application server on a different platform attached to the network 204.

Generally, the computer programs are tangibly embodied in and/or retrieved from RAM, ROM, one or more of the DSUs 206, and/or a remote device coupled to the computer system 200 via one or more of the DCUs 208. The computer programs comprise instructions which, when read and executed by a node 202, causes the node 202 to perform the steps necessary to execute the steps or elements of the present invention.

In the described embodiment of the present invention, the queries conform to the Structured Query Language (SQL) standard and the RDBMS software 210 comprises the Teradata® product offered by NCR Corporation. Those skilled in the art will recognize, however, that the present invention has application to any RDBMS software 210 that uses SQL, and that other alternative hardware environments may be used without departing from the scope of the present invention. The RDBMS software 210 performs the functions necessary to implement the RDBMS functions and SQL standards, i.e., definition, compilation, interpretation, optimization, database access control, database retrieval, and database update.

Structured Query Language (SQL) is a well-known standardized data manipulation language used in databases. SQL can save a considerable amount of programming and is effective to write high-level queries. However, SQL is neither efficient nor adequate to do linear algebra operations. The Expectation-Maximization (EM) clustering algorithm implementation described below addresses this problem by converting matrices to relational tables and using arithmetic operators (+−*/) and functions (exp(x), ln(x)) available in the DBMS, as well as the following SQL commands: CREATE TABLE, used to define a table and its corresponding primary index; DROP TABLE, used to delete tables; INSERT INTO [table] SELECT, used to add data rows to one table from a select expression; DELETE, used to delete a number of rows from a table; and UPDATE, used to set columns to different values.

Expectation—Maximization (EM) Cluster Analysis

Clustering is one of the most important tasks performed in Data Mining applications. Cluster analysis finds groupings in the data, and identifies homogenous ones of the groupings as clusters. Unfortunately, most known clustering algorithms do not work well with large databases due to memory limitations and the execution times required. Often, the solution to finding clusters from massive amounts of detailed data has been addressed by data reduction or sampling, because of the inability to handle large volumes of data. However, data reduction or sampling results in the potential loss of information.

The present invention, on the other hand, solves this problem by performing cluster analysis within the parallel RDBMS 214. In the preferred embodiment, the cluster analysis is performed using a series of Extended ANSI SQL statements and/or a series of scripts comprising groups of statements. A key feature of the present invention is that high-intensity processing (i.e., data intensive aspects) may be performed directly within the RDBMS using Extended ANSI SQL.

There are two basic approaches to perform clustering: those based on distance and those based on density. Distance-based approaches identify those regions in which points are close to each other according to some distance function. On the other hand, density-based clustering finds those regions which are more highly populated than adjacent regions. The Expectation-Maximization (EM) algorithm is an algorithm based on distance computation. It can be seen as a generalization of clustering based on computing a mixture of probability distributions.

The EM algorithm assumes that the data can be fitted by a linear combination (mixture) of normal (Gaussian) distributions. The probability density function (pdf) for the normal distribution on one variable x is:

$$p(x) = \frac{1}{\sqrt{2\pi\sigma^2}} \exp\left[\frac{-(x-\mu)^2}{2\sigma^2}\right] \quad \text{EQN 1}$$

This pdf has expected values: $E[X]=\mu, E[(x-\mu)^2]=\sigma^2$. The mean of the distribution is $\mu$ and its variance is $\sigma^2$. Samples from points having this distribution tend to form a cluster around the mean. The points scatter around the mean is measured by $\sigma^2$.

The multivariate normal probability density function for a p-dimensional space is a generalization of the previous function. The multivariate normal density for a p-dimensional vector $x=x_1, x_2, \ldots, x_p$ is:

$$p(x) = \frac{1}{(2\pi)^{p/2}|\Sigma|^{1/2}} \exp\left[-\frac{1}{2}(x-\mu)^t \sum\nolimits^{-1} (x-\mu)\right] \quad \text{EQN 2}$$

where $\mu$ is the mean and $\Sigma$ is the covariance matrix; $\mu$ is a p-dimensional vector and $\Sigma$ is a p * p matrix. $|\Sigma|$ is the determinant of $\Sigma$ and the t superscript indicates transposition. The quantity $\delta^2$ is called the squared Mahalanobis distance: $\delta^2=(x-\mu)^t\Sigma^{-1}(x-\mu)$. This formula forms the basic ingredient to implement EM in SQL.

The EM algorithm assumes the data is formed by the mixture of k multivariate normal distributions on p variables. The Gaussian (normal) mixture model probability function is given by:

$$p(x) = \sum_{i=1}^{k} \omega_i p(x|i) \quad \text{EQN 3}$$

where p(x/i) is the normal distribution for each cluster and $\omega_i$ is the fraction (weight) that cluster i represents from the entire database. The present discussion focuses on the case that there are k different clusters, each having their corresponding vector $\mu$, but all of them having the same covariance matrix $\Sigma$. However, this work may readily be extended to handle a different $\Sigma$ for each cluster.

The EM clustering algorithm works by successively improving the solution found so far. The algorithm stops when the quality of the current solution becomes stable; as measured by a monotonically increasing statistical quantity called loglikelihood. The goal of the EM algorithm is to estimate the means C, the covariances R and the mixture weights W of the Gaussian mixture probability function described above. The parameters estimated by the EM algorithm are stored in the matrices illustrated in FIG. 3 whose sizes are shown in FIG. 4.

The EM algorithm starts from an approximation to the solution. This solution can be randomly chosen, or set by the user when there is some idea about potential clusters. A common way to initialize the parameters is to set C←$\mu$random(), R←I and W←1/k; where $\mu$ is the global mean. It should be noted that this algorithm can get stuck in a locally optimal solution depending on the initial approximation, so one disadvantage of EM is that it is sensitive to the initial solution, and sometimes it cannot reach a global optimal solution. Nevertheless, EM offers many advantages in addition to being efficient and having a strong statistical basis. One of those advantages is that EM is robust to noisy data and missing information.

Pseudo code for the EM algorithm is shown in FIG. 5. The EM algorithm has two major steps: an Expectation step and a Maximization step. The EM algorithm executes the Expectation step and the Maximization step as long as the change in global loglikelihood (referred to as llh inside the pseudo code) is greater than $\epsilon$ or as long as the maximum number of iterations has not been reached. The global loglikelihood is compute as $$llh = \sum_{i=1}^{n} \ln(sump_i).$$

The variables $\delta$, P, and X are x×k matrices storing Mahalanobis distances, normal probabilities and responsibilities, respectively for each of the n points.

This is the basic framework of the EM algorithm and forms the basis for translation of the EM algorithm into SQL. There are several important observations, however:

C', R' and W' are temporary matrices used in computations. Note that they are not the transpose of the corresponding matrices.

$\|W\|=1$, that is, $$\sum_{i=1}^{k} \omega_i = 1.$$

Each column of C is a cluster; $C_j$ is the jth column of C. $y_i$ is the ith data point.

R is a diagonal matrix in the context of this discussion (statistically meaning that covariances are independent), i.e., $R_{ij}=0$ for $i \neq j$. The diagonality of R is a key assumption to make linear gaussian models work with the EM algorithm. Therefore, the determinant and inverse of R can be computed in time O(p). Note that under these assumptions the EM algorithm has complexity O(kpn). The diagonality of R is a key assumption for the SQL implementation. Having a non-diagonal matrix would change the time complexity to $O(kp^2n)$.

The first important substep in the Expectation step is computing the Mahalanobis distances δij. With R assumed to be diagonal, the Mahalanobis distance of point y to cluster mean C having covariance R can be expressed by the following equation:

$$\delta^2 = (y-C)^t(y-C) = \sum_{i=1}^{p} \frac{(y_i - C_i)^2}{R_i} \quad \text{EQN 4}$$

This is because $R_{ij}^{-1}=1/R_{ij}$. For a non-singular diagonal matrix, $R^{-1}$ is easily computed by taking the multiplicative inverses of the elements in the diagonal. $R^{-1}$ being a diagonal, all the products $(y_i-C_i)R_j^{-1}=0$ when $i \neq j$. A second observation is that R being diagonal can be stored as a vector saving space, but more importantly speeding up computations. Accordingly, R will be indexed with just one subscript in the discussion which follows. Since R does not change during the Expectation step its determinant can be computed only once, making probability computations ($P_{ij}$) faster. For the Maximization step, since R is diagonal the covariance computation is simplified. Elements off the diagonal in the computation $(y_i-C_j)x_{ij}(y_i-C_j)^t$ become zero. In simpler terms, $R_i=R_i+x_{ij}(y_{ij}-C_{ij})^2$ is faster to compute. The remaining computations cannot be further optimized mathematically.

In practice $p_{ij}=0$ sometimes, as computed in the Expectation step. This may happen because $$\exp\left[-\frac{1}{2}\delta_{ij}\right] = 0$$

when $\delta_{ij}>600$; that is, when the Mahalanobis distance is large. There is a simple and practical reason for this: the numeric precision available in the computer. In most data base management systems and current computers the maximum accuracy available for numeric computations is double precision which uses 8 bytes. For this precision the exp(x) mathematical function is zero when x<−1200.

A large Mahalanobis distance for one point can be the result of noisy data, poor cluster initialization, or the point belonging to an outlier. This problem needed to be solved in order to make SQLEM a practical solution. Again, this problem occurs because the computer cannot keep the required accuracy, and not because the EM algorithm is making a wrong computation. To address this problem, the following equation provides an alternative for $\delta_{ij}$ when distances are large:

$$p_{ij} = \frac{1/\delta_{ij}}{\sum_{j=1}^{k} 1/\delta_{ij}}, \quad j \in \{1 \ldots k\} \quad \text{EQN 5}$$

Note that this computation produces a higher probability to points closer to cluster j and is never undefined as long as distances are not zero. Also, if some distance $\delta_{ij}$ is zero then $\exp(\delta_{ij})=\exp(0)$ is indeed defined (being equal to 1) and thus it can be used without any problem.

In many cases the individual covariance for some dimensions (variables) becomes zero in some clusters, or more rarely, in all the clusters. This can happen for a number of reasons. Missing information, in general, leaves numerical values equal to zero. Clusters involving categorical attributes tend to have the same value on the corresponding column. As shown in FIG. 5, the Expectation step computes $$p_{ij} = \frac{\omega_j}{(2\pi)^{p/2}|R|^{1/2}} \exp[-0.5\delta_{ij}] \text{ for } i=1 \ldots n, j=1 \ldots k.$$

As can be seen, the computation for $p_{ij}$ requires dividing by $\sqrt{|R|}$ and computing $R^{-1}$ for Mahalanobis distances $\delta_{ij}$. Therefore, the problem is really a division by zero problem, which is undefined, and computing $R^{-1}$, which is also undefined. But the EM algorithm implementation described herein uses only one global covariance matrix for all the clusters, and therefor R=

$$\sum_{i=1}^{k} R^i,$$

where $R^i$ is the corresponding covariance matrix for cluster i. This is clearly illustrated in the Maximization step of FIG. 5. It has been found in practice that as k grows the chance of having $R_i=0$ is very small; although still possible. Having only one global covariance matrix R solves this problem in part, but results in a small sacrifice in cluster description accuracy.

In the event that $\exists i$, s.t. $i \in \{1 \ldots k\}$ and $R_i=0$, the following method is used to compute $|R|$ and $R^{-1}$. To compute the Mahalanobis distances, variables whose covariance is zero are skipped and dividing by zero avoided ($R_i=0$). Having a null covariance means all the points have zero distance between them in the corresponding dimensions and there is no affect on $\delta_{ij}$. In other words, $R^{-1}$ is computed for the subspace in which covariances are not zero. An analogous process is utilized to compute $|R|$. Note that noise independence implies $|R|=\Pi^p_{i=1}R_i$ and null covariances can be ignored. Therefore, $|R|=\Pi^p_{i=1,R_i \neq 0}R_i$. But again, there is a price to pay: loglikelihood computation is affected. Skipping null covariances solves the problem of undefined computations but loglikelihood decreases sometimes.

Implementation of the EM Algorithm in SQL

The first challenge in implementing the EM algorithm in SQL is to compute the k squared Mahalanobis distances for each point to each cluster. The next challenge is to compute the k probabilities and k responsibilities. These are computed by evaluating the normal density function with the corresponding distance for each cluster. After responsibilities are computed the mixture parameters are updated; this requires computing several relational aggregate functions. Updating C and R requires several matrix products that are expressed as aggregate SQL sums of arithmetic expressions. Updating W requires only doing a SUM on computed responsibilities.

Figure 7:
FIG. 7 illustrates SQL code for Performing clustering in very large databases in accordance with the present invention.

It is assumed that in general $k \leq p$ (for high-dimensional data) and $p << n$. These assumptions are important for performance. In any case the solution described below will work well for large n as long as $p \leq 100$, $k \leq 100$. The SQL code for the Expectation step is illustrated in FIGS. 7. The SQL statements required to create and drop tables and their indexes, to delete rows, and to transpose C and R, are omitted for brevity.

Given a good initialization, the SQL Expectaion-Maiximization algorithm converges quickly. Clusters may be initialized to random values, or to parameters obtained from a sample, e.g. 5% for large data sets or 10% for medium sized data sets. To avoid making unnecessary computations, the maximum number of iterations is limited to some fixed number, such as ten iterations, possibly as high as twenty iterations.

The data points and the Gaussian mixture parameters must be stored in tables. Following the notation defined earlier, a few more conventions for naming columns in SQL are utilized in this discussion: column name i indicates the cluster number, i.e., $i \epsilon \{1 \ldots k\}$; column name v indicates the variable number; that is, $v \epsilon \{1 \ldots p\}$; val is the value of the corresponding column; $w_i$ indicates the ith cluster weight; and RID stands for row id which provides a unique identifier for each data point.

All remaining parameters needed for computations are stored in a table called GMM (Gaussian Mixture Model). These parameters include all the matrix sizes p, k, and n; the constant needed in the density function computation twopipdiv2=$(2\pi)^{P/2}$; the square root of the determinant of the covariance matrix sqrtdetR=$\sqrt{|R|}$ and number of iterations. The table YX stores the loglikelihood for each point as well as a score, which is the index of the cluster with highest membership probability for that point.

Using a "horizontal" approach, the Mahalanobis distances are computed in k terms of a SELECT statement. Each of the k terms is a sum of squared distances divided by the corresponding covariance as seen in the previous section. This is very efficient since all k squared Mahalanobis distances ($\delta^2$) are computed in one table scan, however since there are no arrays in SQL the sum has to be expanded to a long string to sum the p terms.

The tables required to implement the horizontal approach in the most efficient manner are shown in FIG. 6. It is important to note that C is stored in k tables, $C_1$ through $C_k$, to avoid having k different select statements to compute distances. This avoids launching k statements in parallel, which would be slow, or doing the k selects sequentially. The SQL code for performing this operation is shown in FIG. 7.

The process for updating the mixture parameters C, R and W will now be described. First of all, there is no need to create separate tables C', W' and R' as seen in the pseudo code for the EM algorithm shown in FIG. 5. All temporary results are stored in the corresponding tables C, R and W.

To update C it is necessary to execute k select statements updating $C_j$, each statement computing the product $y_i x_{ij}$ for $j=1 \ldots k$, and then making a SUM over all n rows to update the cluster means from cluster j: table $C_j$. Each of these k SELECT statements join tables Y and YX by the primary key RID, multiplying $y_i$ by $x_{ij}$.

Updating weights in W' is straightforward. The responsibilities and loglikelihood stored in YX are summed and then dividing by n. This is done through use of a single SELECT statement using the SQL aggregate function SUM. Having computed C' and W', $C_j$ is updated in accordance with $C_j = C'_j / W'_j$. Having C updated, covariances R are computed by launching k SELECT statements, each statement computing $R' = R' + (y_i - C_j) x_{ij} (y - C_j)^t$ with $j=1 \ldots k$. Covariances R and weights W are updated in accordance with R=R'/n and W=W'/n. n is stored in the table GMM.

The foregoing description of the SQL implemented clustering algorithm of the present invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for performing clustering within a relational database management system to group a set of n data points into a set of k clusters, each data point having a dimensionality p, the method comprising the steps of:
   establishing a plurality of first tables, C1 through Ck, each table having p columns and 1 row, for the storage of means values, each one of tables C1 through Ck representing a cluster;
   establishing a second table, R, having p columns and 1 row, for the storage of covariance values;
   establishing a third table, W, having k+1 columns and 1 row, for the storage of weight values; and
   executing a series of SQL commands implementing an Expectation-Maximization clustering algorithm to iteratively update the means values, covariance values and weight values stored in said first, second and third tables.

2. The method for performing clustering within a relational database management system in accordance with claim 1, wherein said step of executing a series of SQL commands implementing an Expectation-Maximization clustering algorithm to iteratively update the means values, covariance values and weight values stored in said first, second and third tables continues until a specified number of iterations has been performed.

3. The method for performing clustering within a relational database management system in accordance with claim 1, wherein said first, second and third tables represent matrices.

4. The method for performing clustering within a relational database management system in accordance with claim 3, wherein said third table, R, represents a diagonal matrix.

5. The method for performing clustering within a relational database management system in accordance with claim 1, wherein:
   $k \leq p$; and
   $p << n$.

6. The method for performing clustering within a relational database management system in accordance with claim 5, wherein:
   $p \leq 100$; and
   $k \leq 100$.

7. The method for performing clustering within a relational database management system in accordance with claim 3, further comprising the steps of:

establishing a fourth table, Z, having p column and n rows, for the storage of dimensionality values p for each data point n; and establishing a fifth table, Y, having 1 column and p * n rows, for the storage of values; and wherein said step of executing a series of SQL commands implementing an Expectation-Maximization clustering algorithm to iteratively update the means values, covariance values and weight values stored in said first, second and third tables includes the steps of:

for each of said n data points, calculating Mahalanobis distances using a vertical approach wherein said Mahalanobis distances are calculated by using SQL aggregate functions joining tables Y, C and R; and for each of said n data points, calculating means values, covariance values and weight values using a horizontal approach.

* * * * *